United States Patent
Shriram et al.

(10) Patent No.: US 12,039,003 B2
(45) Date of Patent: Jul. 16, 2024

(54) ARTIFICIAL INTELLIGENCE MODEL TRAINING THAT ENSURES EQUITABLE PERFORMANCE ACROSS SUB-GROUPS

(71) Applicant: GE Precision Healthcare LLC, Milwaukee, WI (US)

(72) Inventors: Krishna Seetharam Shriram, Bengaluru (IN); Chandan Kumar Mallappa Aladahalli, Bengaluru (IN); Vikram Reddy Melapudi, Bengaluru (IN)

(73) Assignee: GE PRECISION HEALTHCARE, LLC, Waukesha, WI (US)

( * ) Notice: Subject to any disclaimer, the term of this patent is extended or adjusted under 35 U.S.C. 154(b) by 417 days.

(21) Appl. No.: 17/532,540

(22) Filed: Nov. 22, 2021

(65) Prior Publication Data

US 2023/0161838 A1 May 25, 2023

(51) Int. Cl.
*G06N 20/00* (2019.01)
*G06F 18/21* (2023.01)
*G06F 18/2115* (2023.01)
*G06F 18/214* (2023.01)

(52) U.S. Cl.
CPC ........ *G06F 18/2115* (2023.01); *G06F 18/214* (2023.01); *G06F 18/217* (2023.01); *G06N 20/00* (2019.01)

(58) Field of Classification Search
None
See application file for complete search history.

(56) References Cited

U.S. PATENT DOCUMENTS

2022/0101048 A1* 3/2022 Tan .................. G16H 50/20
2023/0070086 A1* 3/2023 Cruz .................. G06N 5/01

OTHER PUBLICATIONS

Goel, K. et al. | "Model Patching: Closing the Subgroup Performance Gap with Data Augmentation". arXiv:2008.06775v1 [cs.LG] Aug. 15, 2020, 30 pages.
Banerjee, I. et al. | "Reading Race: AI Recognises Patient's Racial Identity In Medical Images". arXiv:2107.10356, Jul. 2021, 46 pages.

* cited by examiner

*Primary Examiner* — Dov Popovici
(74) *Attorney, Agent, or Firm* — Amin, Turocy & Watson, LLP

(57) ABSTRACT

Techniques are described that facilitate training an artificial intelligence (AI) model in a manner that ensures equitable model performance across different sub-groups. According to an embodiment, a system is provided that includes a memory that stores computer executable components, and a processor that executes the computer executable components stored in the memory. The computer executable components include a training component that trains a machine learning (ML) model on training data to perform an inferencing task using an equitable loss function that drives equitable performance of the ML model across different sub-groups represented by the training data, resulting in trained version of the ML model that provides a defined equitable performance level across the different sub-groups. The equitable loss function is "sub-group aware" and penalizes variation in model performance across the sub-groups during model training and validation.

20 Claims, 8 Drawing Sheets

ARTIFICIAL INTELLIGENCE MODEL TRAINING THAT ENSURES EQUITABLE PERFORMANCE ACROSS SUB-GROUPS

TECHNICAL FIELD

This application relates to artificial intelligence (AI) model development, and more particularly to training techniques that ensure equitable model performance across different sub-groups.

BACKGROUND

Artificial intelligence (AI) and machine learning (ML) is a rapidly progressing technical field impacting a wide range of industries. Advancements in machine learning technologies such as deep neural networks and have recently shown impressive performance, sometimes exceeding humans, in various AI domains, including computer vision, speech, natural language processing (NLP), bioinformatics, drug design, medical image analysis, and more. As machine learning algorithms continue to evolve to enable increasingly more sophisticated and precise automated inferencing capabilities, the goal of keeping AI's impact on society beneficial has drawn attention to areas of verification, validity, security and control. For example, while NLP technical errors of an AI personal assistant in interpreting everyday commands may be irritating, and in some cases amusing, the accuracy of AI based outputs becomes much more important when they control cars, planes, automated trading systems, power grids, security systems, etc.

The performance accuracy of machine learning models/algorithms used in the medical context is of critical importance, particularly in scenarios in which the output of the machine learning models/algorithms control the operation of a life sustaining medical device. Medical software refers to any software or system used within a medical context, such as standalone software used for diagnostic or therapeutic purposes, software embedded in a medical device, software that drives a medical device or determines how it is used, software that acts as an accessory to a medical device, software used in the design, production, and testing of a medical device, and software that provides quality control management of a medical device.

The regulatory environment for medical software can have varying requirements and levels of scrutiny depending on the type, intended use, and level of risk associated with the software. For example, prior to authorized usage in clinical practice as a "cleared medical product," some regulatory agencies require software classified as a medical device, often referred to as software as a medical device (SaMD), to comply with the same regulatory pathway used for tangible medical devices. Regulatory approval of medical AI models is also conditional on their unbiased performance on sub-groups of data. The sub-groups are usually constructed using demographic or medical condition meta information. Currently, the sub-group analysis is not a part of the model training process, and the overall accuracy of the model does not necessarily extend to each of the identified sub-groups. Some solutions address this by equalizing the number of training samples from each sub-group through augmentation or increased sampling. However, these methods do not ensure equitable model performance in the field and thus may not be well received by regulatory approval.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described herein that facilitate developing AI models that perform equally across different sub-groups.

According to an embodiment, a system is provided that comprises a memory that stores computer executable components, and a processor that executes the computer executable components stored in the memory. The computer executable components comprise a training component that trains a ML model on training data to perform an inferencing task using an equitable loss function that drives equitable performance of the ML model across different sub-groups represented the training data, resulting in trained version of the ML model that provides a defined equitable performance level across the different sub-groups. The different sub-groups are labeled in the training data and the equitable loss function is configured to identify the different sub-groups using the labels. In this regard, the equitable loss function can be considered "sub-group aware" and penalize variation of performance across the sub-groups during model training and validation.

In some embodiments, elements described in connection with the disclosed systems can be embodied in different forms such as a computer-implemented method, a computer program product, or another form.

DETAILED DESCRIPTION

Figure 1:
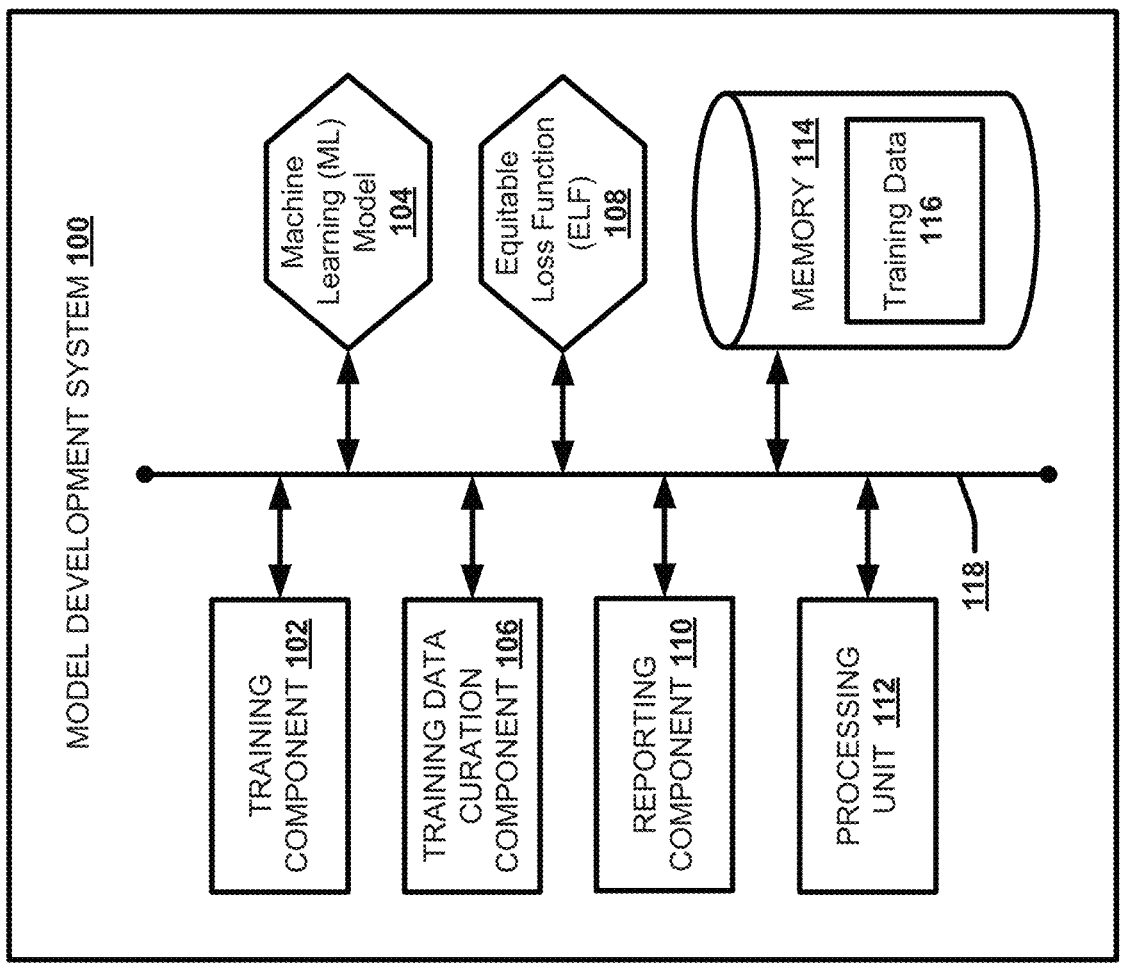
FIG. 1 illustrates a block diagram of an example, non-limiting system that facilitates developing AI models that perform equally across different sub-groups in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to techniques that facilitate developing AI models that perform equally across different sub-groups. The main challenge the disclosed techniques proactively address is the development of un-biased AI models that ensure requirements of regulatory approval are met. In particular, medical AI models are analyzed for biases in association with submission for regulatory approval (e.g., by the Food and Drug Administration (FDA) and similar agencies) by inferring on demographic and other clinically relevant subgroups. This is usually done after the model has been trained and its biases (if any) are identified. A deficient performance in any of the identified sub-groups leads to further data acquisition. The training and validation process however is unaware of the existence of sub-groups and the mean accuracy may not extend to all of them.

To facilitate this end, the disclosed subject matter provides AI model training and validation techniques that result in generating an AI model that performs equally (e.g., relative to a defined threshold of equality) across defined sub-groups represented in the training data. The disclosed techniques account for the model's equitable performance across different sub-groups during the training process through a sub-group aware loss function, referred to herein as an "equitable loss function," or "ELF." In one or more embodiments, the disclosed techniques group the training data into multiple cohorts, one each for identified relevant sub-group. For example, as applied to a clinical AI model adapted to perform a clinical inferencing task on medical images or other forms of clinical data, the sub-groups may be defined based on demographic factors (e.g., patient age, patient gender, image acquisition location, patient body mass index (BMI), etc.) clinical factors (e.g., pathology, comorbidities, etc.), imaging factors (e.g., acquisition protocols, acquisition parameters, etc.), and other factors. The loss across each of the sub-groups can be combined in one of many ways to ensure the model is trained without biases.

The ELF can be directly used during the model training phase and/or as part of validation phase to obtain the optimal model whose performance is equal across sub-groups by penalizing variation in model performance amongst the sub-groups and/or weighing losses inversely to sub-group sample size. For example, in some embodiments, the ELF can be configured to compute the loss by the different sub-groups and weight them appropriately to drive the training optimization during the training phase. Additionally, or alternatively, the ELF can be configured to compute the loss by the different sub-groups and determine the optimal model based on such loss on the validation dataset. The ELF can also be configured to minimize the standard deviation across sub-groups. The equality in performance can reflect a same or similar (e.g., relative to a defined degree of similarity) measure of accuracy and/or specificity of the model's performance for each of the sub-groups, measured as a function of a confidence score, a confidence interval, an accuracy score, a mean loss value (e.g., measured using Dice loss, adaptive loss, a distance metric, or the like), or another accuracy metric.

This approach does not requires altering the training dataset like duplication or augmentation and hence can be used in any existing training workflow. In this regard, the disclosed techniques operate within the available raining data and engineer the loss that drives the model training and selection process to meet the desired level of equitable model performance across defined relevant sub-groups. Thus, the disclosed techniques can ensure the bias-free regulatory agency requirements of a clinical AI model are met, and hence facilitate and easier path for regulatory approval while reducing the amount of amount of time and training data needed for model training and validation.

The disclosed techniques can be applied in various domains in which AI models are required or preferred to perform equally across different sub-groups represented in the input data. For instance, the disclosed techniques can be applied in the healthcare domain in association generating bias-free clinical inferencing models that are considered SaMD and thus require regulatory approval. The disclosed techniques can also be applied to generate bias-free AI/ML models that provide AI informatics at the healthcare administrative level to facilitate planning, regulating, and managing medical services. For example, such AI/ML models can include models adapted to process patient data in association with optimizing patient scheduling and bed management and optimizing clinical and financial outcomes of patient care delivery. The disclosed techniques can also be extended to various other industries or domains in addition to healthcare. For example, the disclosed techniques can be applied to create bias-free AI/ML models used in the marketing industry to automatically identify trends and deliver more personalized advertisements and products to consumers. Other industries that can employ the disclosed AI/ML model training and development techniques to facilitate integrating bias-free AI informatics into their systems can include for example, educational systems, manufacturing systems, legal systems, personalized assistance systems, government regulatory systems, security systems, machine-to-machine (M2M) communication systems, agriculture systems, etc. The possibilities are endless.

The terms "algorithm" and "model" are used herein interchangeably unless context warrants particular distinction amongst the terms. The terms "AI model" and "ML model" are used herein interchangeably unless context warrants particular distinction amongst the terms. The types of AI and ML models or algorithms that the disclosed bias-free model training and development techniques can be applied can vary. In this regard, the particular inferencing task, input data, and model architecture can vary.

The term "clinical inferencing model" is used herein to refer to an AI/ML model configured to perform a clinical decision/processing on clinical data. The clinical decision/processing task can vary. For example, the clinical decision/processing tasks can include classification tasks (e.g., disease classification/diagnosis), disease progression/quantification tasks, organ segmentation tasks, anomaly detection tasks, image reconstruction tasks, and so on. The clinical inferencing models (and other ML models trained according to the disclosed techniques) can employ various types of ML algorithms, including (but not limited to): deep learning models, neural network models, deep neural network models (DNNs), convolutional neural network models (CNNs), generative adversarial neural network models (GANs), long short-term memory models (LSTMs), attention-based models, transformers and the like.

The type of the input data processed by the clinical inferencing models can also vary. For example, in some embodiments, the clinical inferencing models can include medical image processing models adapted to generate inferences on medical images. As used herein, a "medical imaging inferencing model" refers to an image inferencing model that is tailored to perform an image processing/analysis task on one or more medical images. For example, the medical imaging processing/analysis task can include (but is not limited to): image reconstruction, image enhancement, scan series characteristic classification, disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

The term "image-based inference output" is used herein to refer to the determination or prediction that an image processing model is configured to generate. For example, the image-based inference output can include a segmentation mask, a reconstructed image, an enhanced image, an adapted image, an annotated image, a classification, a value, or the like. The image-based inference output will vary based on the type of the model and the particular task that the model is configured to perform. The image-based inference output can include a data object that can be rendered (e.g., a visual data object), stored, used as input for another processing task, or the like. The terms "image-based inference output", "inference output" "inference outcome," "inference result" "inference", "output", "outcome," "predication", and the like, are used herein interchangeably unless context warrants particular distinction amongst the terms. The outputs can be in different formats, such as for example: a Digital Imaging and Communications in Medicine (DICOM) structured report (SR), a DICOM secondary capture, a DICOM parametric map, an image, text, and/or JavaScript Object Notation (JSON).

The types of medical images processed/analyzed by the medical image inferencing models described herein can include images captured using various types of image capture modalities. For example, the medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can also include synthetic versions of native medical images such as synthetic X-ray (SXR) images, modified or enhanced versions of native medical images, augmented versions of native medical images, and the like generated using one or more image processing techniques. The medical imaging processing models disclosed herein can also be configured to process 3D images.

The disclosed techniques can also be applied to AI/ML models adapted to process multimodal input data and/or other forms of input data besides images. The term "multimodal data" is used herein to refer to two or more different types of data. The differentiation factor between the two or more different types of data can vary. For example, the differentiation factor can refer to the medium of the data (e.g., image data, text data, signal data, etc.), the format of the data, the capture modality of the data, the source of the data and so one. In the medical/clinical context, multimodal clinical refers to two or more forms of health-related information that is associated with patient care and/or part of a clinical trial program. Clinical data consists of information ranging from determinants of health and measures of health and health status to documentation of care delivery. Different types of clinical data are captured for a variety of purposes and stored in numerous databases across healthcare systems. Some example types of clinical data that may processed by a clinical inferencing model can include (but is not limited to): medical images and associated metadata (e.g., acquisition parameters), radiology reports, clinical laboratory data, patient electronic health record (EHR) data, patient physiological data, pharmacy information, pathology reports, hospital admission data, discharge and transfer data, discharge summaries, progress notes, demography data and other non-imaging data.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example model development system 100 that facilitates developing AI models that perform equally across different sub-groups in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

In this regard, model development system 100 includes training component 102, machine learning (ML) model 104, training data curation component 106, equitable loss function (ELF) 108, and reporting component 110, all of which can be or include machine-executable components embodied within one or more machines (e.g., embodied in one or more computer-readable storage media associated with one or more machines), which when executed by the one or more machines (e.g., processors, computers, computing devices, virtual machines, etc.) can cause the one or more machines to perform the operations described. For example, the model development system 100 can be any suitable machine that can execute one or more of the operations described with reference to the training component 102, the ML model 104, the training data curation component 106, the ELF 108 and the reporting component 110.

As used herein, the machine can be and/or can include one or more of a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet-enabled phone and/or another type of device. The model development system 100 can also be or correspond to one or more real or virtual (e.g., cloud-based) computing devices. The model development system 100 can further include or be operatively coupled to a least one memory 114 that stores the computer executable components (e.g., the training component 102, the ML model 104, the training data curation component 106, the ELF 108 and the reporting component 110). The memory 114 can also store the training data 116 and/or the training data 116 can be stored at another suitable data storage location accessible to the model development system 100 (e.g., via one or more networks). The model development system 100 can further include or be operatively coupled to at least one processing unit 112 (or processor) that executes the computer-executable components stored in the memory 114. Examples of said and memory 114 and processing unit 112 as well as other suitable computer or computing-based elements, can be found with reference to FIG. 7 (e.g., with reference to processing unit 704 and system memory 706), and can be used in connection with implementing one or more of the systems or components shown and described in connection with FIG. 1 or other figures disclosed herein.

The deployment architecture of model deployment system 100 can vary. In some embodiments, the model development system 100 can be deployed a local computing device. In other embodiments, one or more of the components of system 100 can be deployed in a cloud architecture, a virtualized enterprise architecture, or an enterprise architecture wherein one the front-end components and the back-end components are distributed in a client/server relationship. With these embodiments, the features and functionalities of one or more of the training component 102, the ML model 104, the training data curation component 106, the ELF 108, the reporting component 110, the processing unit 112 and/or the memory can be deployed a web-application, a cloud-application, a thin client application, a thick client application, a native client application, a hybrid client application, or the like. Various example deployment architectures for system 100 are described infra with reference to FIGS. 7-8.

The training component 102 provides for training the ML model 104 to perform a defined inferencing task on the training data 116 using the ELF 108, wherein the ELF 108 drives equitable performance of the ML model 104 across different sub-groups represented the training data 118. The particular type of the ML model 104, the inferencing task performed by the ML model 104, the input data (i.e., the training data 116) processed by the ML model 104, and the factors defining the different sub-groups can vary. For example, in some embodiments, the ML model 104 can include or correspond to a clinical inferencing model adapted to perform a clinical inferencing task on clinical data. With these embodiments, the sub-groups may be defined based on clinical and/or non-clinical factors associated with the clinical data. For instance, assuming the training data 116 includes clinical data associated with different patients, such as medical images acquired for the different patients and/or other forms of clinical data and non-clinical data associated with the different patients (e.g., laboratory data, pathology data, demography data, acquisition protocol data, etc.), the sub-groups may be defined as a function of different types of patients and/or patient groups by one or more factors. For example, the different types of patients or patient groups can be defined based on demographic attributes (e.g., age, gender body mass index (BMI), height/weight, location), clinical factors (e.g., comorbidities, risk level, pathology, etc.), medical history factors, psychosocial risk factors, and so on.

The training process performed by the training component 102 can involve conventional ML training and validation and testing phases associated with supervised, semi-supervised and/or unsupervised ML training and development processes with the usage of an ELF 108 instead of a conventional loss function. A detailed description of the training process and the ELF 108 is described infra. This training process results in generation of a trained version of the ML model 104 that provides a defined equitable performance level across the different sub-groups. The equality in performance can reflect a same or similar (e.g., relative to a defined degree of similarity) measure of accuracy and/or specificity of the model's performance for each of the sub-groups, measured as a function of a confidence score, a confidence interval, an accuracy score, a mean loss value (e.g., measured using Dice loss, adaptive loss, a distance metric, or the like), or another accuracy metric.

Figure 2:
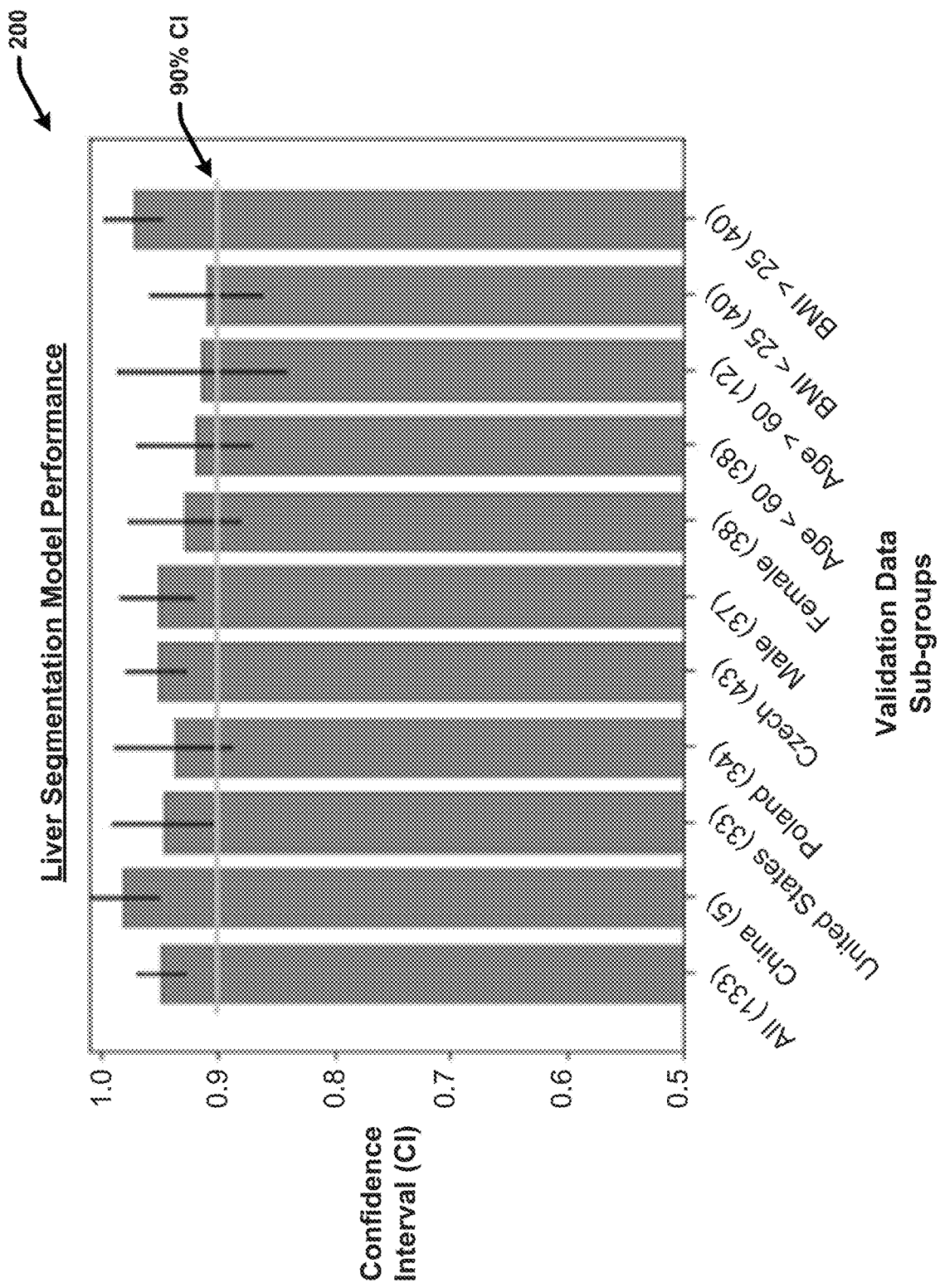
FIG. 2 presents a graph illustrating the performance accuracy of an example organ segmentation model across different sub-groups trained without an equitable loss function.

FIG. 2 presents a graph 200 illustrating the performance accuracy of an example organ segmentation model across different sub-groups trained without an equitable loss function such as ELF 108. The organ segmentation model corresponds to a liver segmentation model trained to segment the liver (e.g., via prediction of a corresponding segmentation mask over the liver) in ultrasound medical images captured of the abdomen. The liver segmentation model employed a UNet architecture and was developed using conventional supervised ML training and validation and testing processes. The training data included medical images captured for about 400 subjects (or patients) divided into training, validation and testing subsets. The subjects were differentiable by several clinically relevant factors, including those that constituted the sub-groups identified in the graph 200. However, these sub-groups were not labeled or evaluated during the model training and validation and testing phases. On the contrary, after the model was trained, the images in the validation set were grouped into the different sub-groups based on the factors identified in the graph 200. In particular, the images were grouped by acquisition country (e.g., which included China, United States, Poland, and Czech Republic), male and female gender, age less than 60, age greater than 60, BMI less than 25 and BMI greater than 25. These different sub-groups were determined clinically relevant by experts. The total number of images included in the validation set was 133 and the respective number of images included within each sub-group is indicated next in-line with the corresponding sub-group heading.

The average accuracy of the model relative to all data samples (i.e., images) included in the validation set as well as the average accuracy of the model relative to each sub-group was further determined as function a confidence interval representative of the degree of confidence in the model's ability to generate accurate liver segmentation mask predictions. In this example, the 90% confidence interval marks the minimum acceptable level of confidence desired for all sub-groups. The vertical line included at the top of each bar indicates the upper and lower CI bounds determined for each grouping.

As illustrated in graph 200, although the average CI for each sub-group is above the 90% minimum, the average CI for each of the different subgroup varies, thus indicating the model performance accuracy varies for the different sub-groups. For example, the average model CI for images acquired in China is significantly higher than that for images acquired in Poland. Similarly, the average CI for images captured of male subject is higher than that for female subjects. Graph 200 also demonstrates that the lower CI bound for all subjects taken together is at or near the 95% mark, however, the lower CI bounds for several of the sub-groups drops blow the 90% mark. Accordingly, as demonstrated via graph 200, conventional model development techniques do not guarantee equitable model performance across different clinically relevant sub-groups. Typically, to address this problem, additional data samples are acquired for the underperforming sub-groups and the model is retrained using the additional data samples and revaluated until the model accuracy becomes uniform (e.g., to a defined maximum degree of deviation) across all sub-groups. However, such techniques are limited by the available training data, require additional training time and do not guarantee model accuracy across the different subgroups after deployment in the field.

With reference again to FIG. 1, with these deficiencies in mind, the disclosed ML model training techniques instead explicitly require the ML model 104 to perform uniformly across all defined sub-groups during draining through the usage of an ELF 108. In this regard, the ELF 108 corresponds to a loss function that has been specifically configured to be aware of the existence of defined sub-groups of data samples represented in the training data 116 and drive the ML model 104 to achieve equitable performance across the different sub-groups during the model training phase and/or the validation phase. To facilitate this end, the respective samples in the training data 116 can be associated with information identifying the defined sub-group (or sub-groups) to which it belongs. Such information may be associated with the data samples as, annotation labels, metadata (e.g., metadata tags) or in a separate indexed data structure. The specific differentiation factors that define the relevant sub-groups represented in the training data 116 may be predefined. In some embodiments, the ELF 108 can be configured to use this information directly during the training phase to identify the specific sub-group to which a data sample belongs and weight the loss accordingly, as described in greater detail below.

Figure 3:
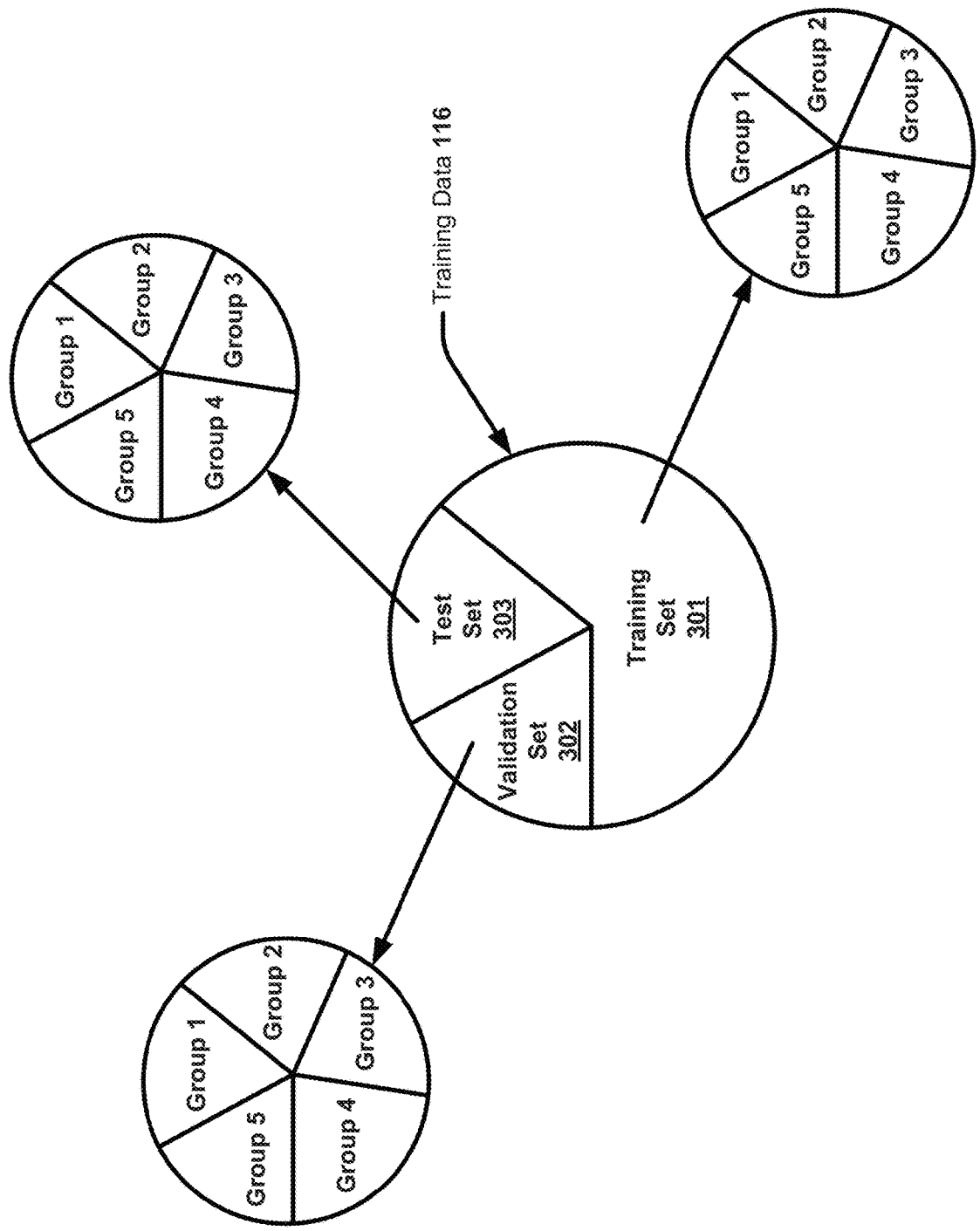
FIG. 3 illustrates grouping of training data based on defined sub-groups in accordance with one or more embodiments of the disclosed subject matter.

Additionally, or alternatively, as illustrated in FIG. 3, the training data curation component 106 can divide the training data 116 into a training set 301, a validation set 302 and a testing set 303. In some implementations, the validation set 302 and the testing set 303 may be combined. In this regard, in accordance with conventional ML training techniques, the training set 301 is used during a model training phase to fit the ML model 104. The validation set 301 is used to provide an unbiased evaluation of the model fit on the training set 302 while tuning the models hyperparameters. The evaluation becomes more biased as skill on the validation set 302 is incorporated into the model's configuration. In this regard, the validation loss is used to select the best version of the ML model 104 generated during the training phase and avoiding overfitting. The test set 303 is used to measure the performance of the version of the ML model 104 selected during the validation phase.

The training data curation component 106 can further group the data samples included in the training set 301, the validation set 302 and the testing set 303 into different sub-groups according to predefined grouping factors (e.g., demographic factors, pathology factors, image acquisition factors, etc.). Information defining the predefined grouping factors can be stored in memory 114 and the training data curation component 106 can employ metadata tags associated with the training data samples included in the training data 116 to perform the grouping. In other embodiments, the training data curation component 106 can employ one or more machine learning techniques to automatically cluster the training data 116 into two or more distinct subgroups, such as k-means clustering, hierarchical clustering, or the like. With these, embodiments, the training data curation component 116 may infer the grouping factors. In the example shown in FIG. 3, the subgroups include five different subgroups (respectively identified as group 1, group 2, group 3, group 4 and group 5). The respective factors used to define the five sub-groups are arbitrary for purposes of this example, as this will depend on the type of the ML model 104, the task of the ML model 104, the type of the training data 104, and so on. Likewise, it should be appreciated that the number of different sub-groups can vary. The number of data samples respectively included in the training set 301, the validation set 302 and the testing set 303 can also vary. Typically, the training set 301 can includes about 60% of the samples included in the training data 116, and the validation set 302 and test set 303 respectively include about 20% of the data samples, however these distributions can vary. In most embodiments, the training set 301 includes at least 50% of the data samples included in the training data.

The distribution of data samples included in the respective sub-groups for each of the training set 301, the validation set 302 and the test set 303 can also vary and will depend on the distribution of the respective sub-groups included in the training data 116. In some embodiments, the training data curation component 106 can randomly split the training data 116 into the training set 301, the validation set 302 and the test set 303 and thereafter cluster the respective sets into the different subgroups. Additionally, or alternatively, the training data curation component 106 can perform class balancing to balance the number of data samples included in each group within each of the training set 301, the validation set 302 and the test set 303 according to the defined data split used for the training set 301, the validation set 302 and the testing set. For example, assuming the respective sets are split according to a 60:20:20 ratio, the distribution of data samples included in group 1 can also be split between the training set 301, the validation set 302 and the testing set 303 according to the 60:20:20 ratio. For example, in some embodiments, the training data curation component 106 can initially group the data samples included in the training data 116 as a whole into the defined subgroups (e.g., group 1, group 2, group 3, group 4 and group 5 illustrated in FIG. 3). Thereafter, the training data curation component 106 can distribute each subgroup of data samples between the training set 301, the validation set 302 and the test set 301 according to a defined ratio (e.g., 60:20:20, 60:25:15, 50:25: 25, 70:15:15, or another ratio).

It should be appreciated that in various implementations, the sub-groups are not mutually exclusive. For instance, in accordance with the liver segmentation model sub-groups illustrated in FIG. 1, the sub-groups are divided by geographic area, gender, age and BMI. Naturally, those data samples (e.g., abdomen ultrasound images) included in any of the geographic sub-groups may include data samples belonging to male and female subject, subjects of age over and under 60, and subject with BMIs over and under 25. Thus, in some embodiments, within training set 301, the validation set 302 and/or the test set 303, the training data curation component 106 can generate multiple instances of a data sample that belongs to two or more groups and associated one instance in each group to which it belongs.

In various embodiments, the ML model 104 includes a supervised or semi-supervised ML model and the training component 102 can train the ML model 104 using conventional supervised or semi-supervised machine learning processes with the exception of the usage of the ELF 108. In this regard, in a supervised learning framework, the ML model 104 is first given examples of data by which human experts or annotators apply ground truth classification labels or other forms of ground truth annotations (e.g., segmentation masks, bounding boxes, etc.) to some or all of the samples included in the training data 116. The ground truth annotations are then used by the ML to adapt and change it's internal, mathematical representation (such as the behavior of artificial neural networks) of the data and mapping to some predication of classification etc. The training consists of iterative methods using numerical, optimization techniques that reduce the error or loss between the desired class label and the ML model's prediction. The newly trained model is then given new data as an input and, if trained well, can classify or otherwise provide assessment of novel data.

In accordance with the disclosed techniques the training component 102 can determine the loss between the respective training data samples and their ground truth examples using an ELF 108 that calculates that training and/or validation loss for each of the defined sub-groups. The training component 102 can further combine the loss across each of the sub-groups in one of many ways to ensure the ML model 104 is trained without biases. For example, in some embodiments, the training component 102 can use the ELF 108 during the model training phase to compute the loss by the different sub-groups and weight them appropriately to drive the training optimization during the training phase. Additionally, or alternatively, the ELF can be configured to compute the loss by the different sub-groups and determine the optimal model based on such loss on the validation dataset.

In particular, the ELF 108 can be configured to identify the specific sub-group to which each data sample belongs us information previously associated with the respective data samples identifying the sub-group or sub-groups to which it belongs. Such information can be associated with the respective data samples as annotation labels, in metadata as metadata tags or in another form. The ELF 108 can further penalize variation of performance across the sub-groups. In this regard, divergence between the training loss and/or the validation loss across the subgroups can be accounted for in the ELF 108 to achieve equitable performance of the ML model 104 across the subgroups. In some implementations, if certain sub-groups have a lower representation in the population, the ELF 108 can be configured to be more stringent for these groups to achiever a tighter confidence interval. In this regard, the manner in which the ELF 108 is configured to penalize variation of performance across the sub-groups based on the loss can vary.

In one example embodiment, the ELF 108 can include a loss function configured to weigh the loss (e.g., measured as a function of Dice loss, overlap loss, or another loss metric) for the different sub-groups relative to the number of samples respectively included in each of the different sub-groups within the entirety of the training data 116 such that the subgroups that are underrepresented are weighed more. In this regard, the loss weights defined for the respective sub-groups can be proportional to the representation amounts in the training data 116, wherein the lower the number of data samples included in a sub-group, the higher the loss weight. In this way, the loss associated with an underrepresented sub-group is amplified to balance the loss associated with a higher represented sub-group. In accordance this embodiment, the ELF 108 can be defined according to Equation 1 below, wherein ωi is the weight associated with the $i^{th}$ subgroup and $l_i$ is the loss associated with it, and wherein the weights can be inversely proportional to the sample size of the subgroups. With this embodiment, the loss is biased to provide higher accuracies for sub-groups with smaller sample sizes, thereby tightening the CI bounds of the model.

$$\text{Loss} = \sum_{i=1}^{N} \omega_i l_i. \qquad \text{Equation 1}$$

In another example embodiment, the ELF 108 can include a loss function configured to explicitly reduce the variance in the losses across the sub-groups to ensure the loss (e.g., measure as a function of Dice loss, overlap loss, or another loss metric) is the same or substantially the same (e.g., relative to a defined maximum threshold of deviation) across the different sub-groups. In other words, the ELF 108 can be configured to minimize the standard deviation of the loss across the sub-groups. With these embodiments, the ELF 108 can be defined according to Equation 2 below, wherein, $l_i$ is the loss associated with the $i^{th}$ sub-group and µ is the mean loss across all sub-groups. In accordance with Equation 2, both the total loss and the variance is minimized and biased to have the same accuracy (relative to defined degree of similarity for the accuracy measure) accuracy across all sub-groups.

$$\text{Loss} = \sum_{i=1}^{N} l_i + \sum_{i=1}^{N} (l_i - \mu)^2. \qquad \text{Equation 2}$$

It should be appreciated that the example equitable loss functions defined by Equations 1 and 2 are merely exemplary and other mechanisms for configuring the ELF 108 to penalize variation in model performance across the sub-groups are envisioned.

As noted above, the training component 102 can employ an ELF 108 corresponding to Equation 1, Equation 2 or a similar equation during the training phase and/or the validation phases of the ML model 104 training and development process. During these respective phases, the ELF 108 calculates the loss for respective sub-groups. The training component 102 can further employ the losses calculated for the respective sub-groups to generate a measure of accuracy in the model for the respective sub-groups based on the respective losses. In some embodiments, upon completion of the training (e.g., the training and validation phases), the training component 102 can determine final measures of accuracy of performance of the ML model for each of the sub-groups using a testing set that has been divided into the different sub-groups. For example, the training component 102 can determine a confidence score and/or confidence interval for the model as whole and for each of the individual sub-groups based on the mean, upper and lower loss values associated with each of the sub-groups determined during the training, validation and/or testing phase, wherein the confidence scores and/or confidence intervals represent the degree of confidence in the model accuracy on each of the sub-groups. The reporting component 110 can further generate a report identifying the sub-group specific performance accuracy information. This sub-group specific model performance accuracy information can be included in association with submission of the ML model 104 for regulatory approval, used to benchmark changes in model performance in the field, and/or used for downstream processing tasks. Because the ELF 108 is configured to drive performance of the model to be the same (or substantially the same with respect to a defined degree of deviation) for each of the sub-groups the measure of accuracy in the model for the respective sub-groups will be the same (or substantially the same). For example, with reference again to FIG. 2, the training component 102 can determine the confidence interval information (e.g., including the mean CI and the upper and lower bounds) illustrated in FIG. 2 for each of the sub-groups, and the reporting component 110 can generate a report comprising the confidence interval information shown in graph 200. However, the variance illustrated in FIG. 2 between the sub-groups will be minimized. In this regard, the confidence interval information report generated for ML model trained using the disclosed techniques can serve to confirm the model's equitable performance across the sub-groups.

Figure 4:
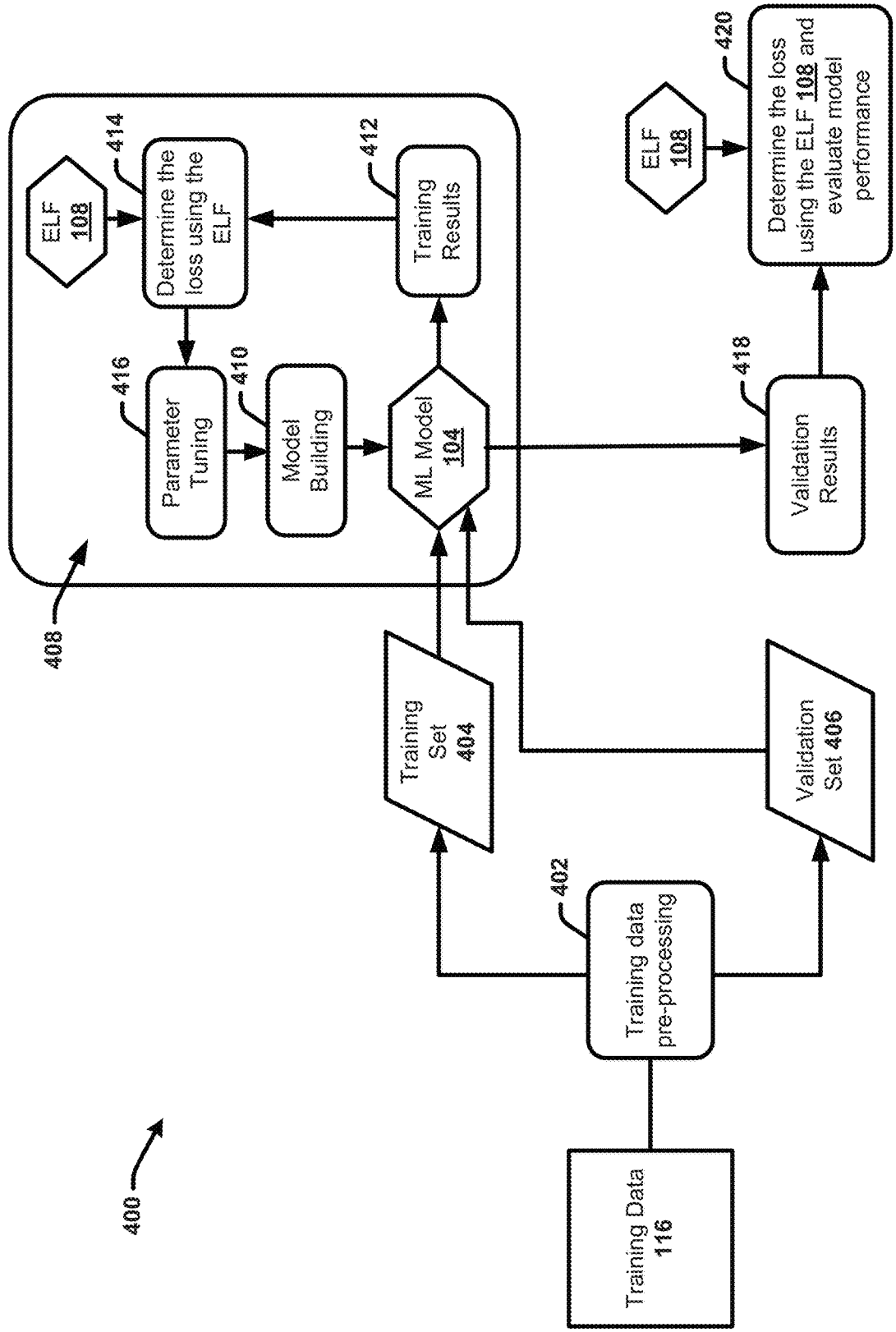
FIG. 4 presents an example training process for training an AI model to perform equally across different sub-groups in accordance with one or more embodiments of the disclosed subject matter.

FIG. 4 presents an example training process 400 for training an ML model 104 to perform equally across different sub-groups in accordance with one or more embodiments of the disclosed subject matter. In various embodiments, the training component 102 can apply process 400 to train a ML model 104 that performs equally across defined sub-groups represented in the training data 116, resulting in a trained version of the ML model 104 that is un-bias toward the different sub-groups upon completion of the training and validation phases. Repetitive description of like elements employed in respective embodiments is omitted for sake of brevity.

The training process 400 can initially involve pre-processing the training data 116 at 402 to divide the training data 116 into a training set 404 and a validation set 406 (e.g., via the training data curation component 106). The pre-processing at 402 can also involve grouping the respective data samples included in the training set 404 and/or the validation set 406 into the defined sub-groups (e.g., via the curation component 106) using information associated with the respective samples (e.g., metadata tags or the like) identifying the respective sub-group or sub-groups to which they belong. In other implementations, the ELF 108 can implicitly perform this grouping in association with calculating the loss using sub-group labels/metadata tags associated with the respective samples. In this example, the training data 116 is not split into a third test set, however, it should be appreciated that in other implementations, the training data 116 may also be split into a test set. Training process 400 however demonstrates the training and validation phases of the model training and development process. It should appreciate that the final model performance following completion of process 400 can be evaluated on the sub-group level using a test set that has also been subdivided into the defined relevant sub-groups. During the testing phase, the mode's configuration and parameters are not adjusted. The pre-processing at 402 can also involve data cleansing/engineering to fill outliers and/or missing values.

The training set 404 is used to train and build the ML model 104 in accordance with process 408. Process 408 involves model building at 410, which involves applying the input data samples included in the training set 404 to the ML model 104 to generate training results 412. For example, assuming the ML model 104 comprises a liver segmentation model and the input data samples include medical images of the abdomen, the training results 412 will include corresponding liver segmentation masks. At 414, process 408 involves determining and evaluating the loss using the ELF 108 based on the ground truth (GT) annotations applied to the corresponding input data samples. As described above, the loss function evaluation at 414 generally involves employing the ELF 108 to determine a measure of difference in accuracy between the training results 412 and the actual GT. The measure of difference in accuracy can be based on a distance metric, such as a Hamming distance, a Jaccard distance/Index, a Dice score/coefficient, adaptive loss, or the like.

In accordance with the subject training phase in which an ELF 108 is used to determine the loss, the ELF 108 can be configured to evaluate the loss as a function of the sub-group classification for each data sample. For example, in some implementation, the ELF 108 can be configured according to Equation 1 and weigh the loss using defined weights determined for each of the different sub-groups, wherein the weights are inversely proportional to the number of data samples included in each sub-groups (e.g., the lower the representation, the higher the weight). In some implementation of these embodiments, the pre-processing at 402 can also involve determining the relative distribution of data samples included in each sub-group (e.g., with respect to the training set 404 and/or the training data 116 as a whole) and defining the weights for the ELF 108 to be used for each sub-group based on the relative distribution.

At 416, process 408 further comprises adjusting the model weights and/or parameters based on the loss to reduce the amount of loss on the next evaluation of the next training data sample. This processes 408 is performed iteratively until the model loss has stabilized to a defined degree and/or otherwise reached convergence.

Once the ML model 408 building has progressed to sufficiency on the training set 404 (e.g., until the model loss has stabilized to a defined degree and/or otherwise reached convergence), the training component 102 can perform the validation phase of the model training process using the validation set 406. In this regard, the training component 102 can apply the validation set 406 to the ML model 104 to generate validation results 418. The training component 102 can further evaluate the validation results 418 using the ELF 108 at 420 to evaluate the performance accuracy and specificity of the ML model 104. For example, the training component 102 can determine the loss between the validation results 418 and the corresponding ground truth exemplars for the data samples included in the validation set 406 using the ELF 108. In association with determining the loss, the training component 102 can determine the loss for the different sub-groups defined in the validation set using the ELF 108. The ELF 108 can further penalize variation of the performance across the sub-groups to drive equitable performance of the ML model 104 across the sub-groups. For example, the loss can be construed to minimize the standard deviation across the sub-groups. The version of the ELF 108 used at 420 can correspond to the same version of the ELF 108 used during the training phase and process 408 or a different version. For example, in some embodiments, the version of the ELF 108 used at 420 can correspond to Equation 2. With these embodiments, the training component 102 can compute the loss for each of the defined sub-groups represented in the validation set 406 and determine the optimal version of the ML model 104 adapted during the training phase 408 that minimizes both the total loss and the variance amongst the sub-groups (e.g., minimize the standard deviation across sub-groups to a defined degree of deviation). Once the model training and validation phases have been completed, the ML model 104 can optionally be tested using a new (unseen) test dataset that includes data samples from the different subgroups.

Figure 5:
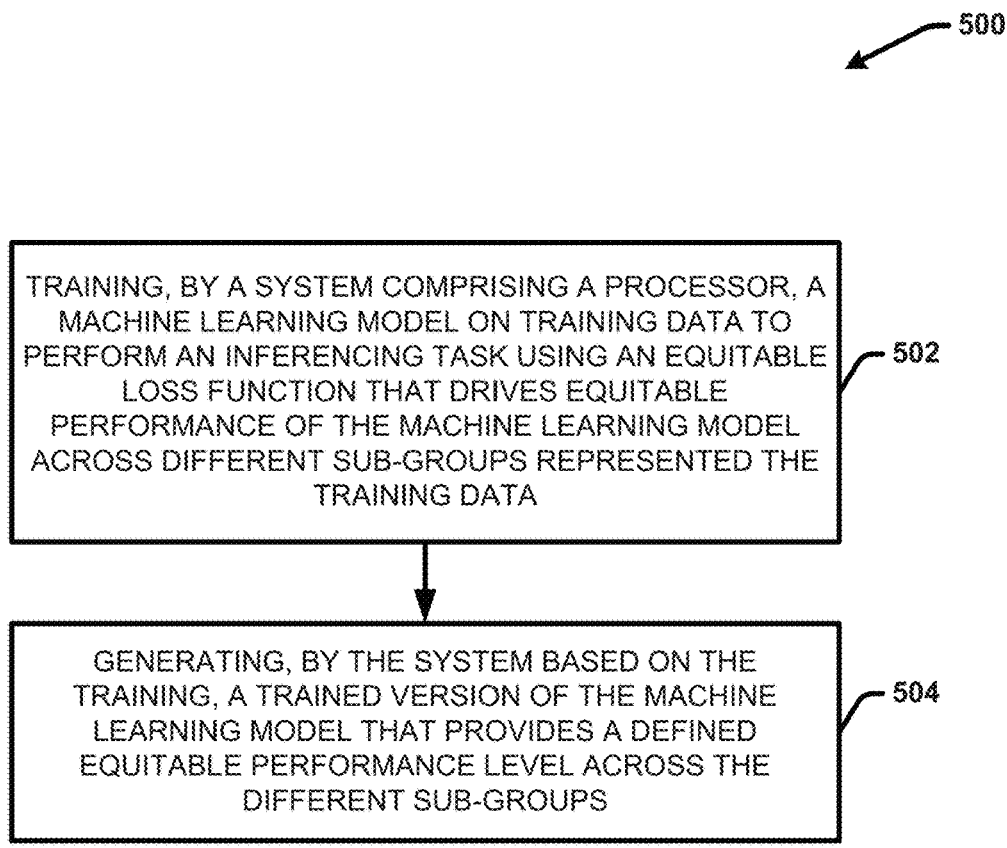
FIG. 5 illustrates a block diagram of an example, non-limiting computer implemented method that facilitates developing an AI model that performs equally across different sub-groups in accordance with one or more embodiments of the disclosed subject matter.

FIG. 5 illustrates a block diagram of an example, non-limiting computer implemented method 500 that facilitates developing an AI model that performs equally across different sub-groups in accordance with one or more embodiments of the disclosed subject matter. Repetitive description of like elements employed in respective embodiments is omitted for sake of brevity.

In accordance with method 500, at 502 a system operatively coupled to a processor (e.g., system 100 or the like) trains (e.g., using training component 102) a machine learning model (e.g., ML model 104) on training data (e.g., training data 116) to perform an inferencing task using an equitable loss function (e.g., ELF 108) that drives equitable performance of the machine learning model across different sub-groups represented the training data. At 504, the system generates, based on the training, a trained version of the machine learning model that provides a defined equitable performance level across the different sub-groups (e.g., via the training component 102).

Figure 6:
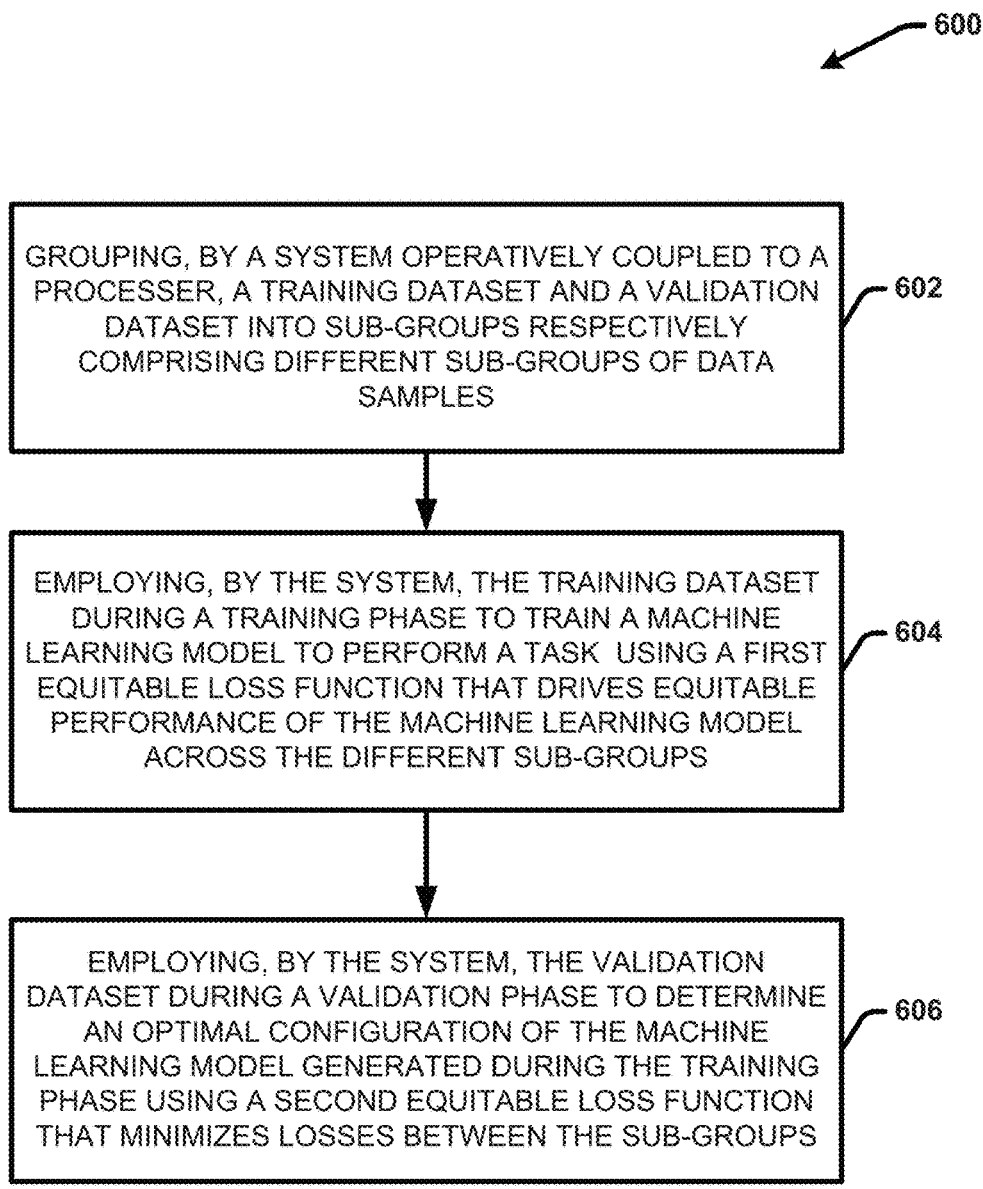
FIG. 6 illustrates a block diagram of another example, non-limiting computer implemented method that facilitates developing an AI model that performs equally across different sub-groups in accordance with one or more embodiments of the disclosed subject matter.

FIG. 6 illustrates a block diagram of another example, non-limiting computer implemented method 600 that facilitates developing an AI model that performs equally across different sub-groups in accordance with one or more embodiments of the disclosed subject matter. Repetitive description of like elements employed in respective embodiments is omitted for sake of brevity.

In accordance with method 600, at 602, a system operatively coupled to a processor (e.g., system 100 or the like) groups a training dataset and a validation dataset into sub-groups respectively comprising different sub-groups of data samples (e.g., using the training data curation component 106. At 604, the system employs the training dataset during a training phase to train (e.g., via training component 102) a machine learning model to perform a task using a first equitable loss function (e.g., ELF 108) that drives equitable performance of the machine learning model across the different sub-groups. At 606, the system can further employ the validation dataset during a validation phase to determine (e.g., via the training component 102) an optimal configuration of the machine learning model generated during the training phase using a second equitable loss function (e.g., ELF 108) that minimizes losses between the sub-groups. In some embodiments, the first equitable loss function and the second equitable loss function are the same. In other implementations, the first and second equitable loss functions can be different (e.g., Equations 1 and 2 for instance). In other embodiments, the equitable loss function can be used during either the training phase or the validation phase, but not both.

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 7, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 7:
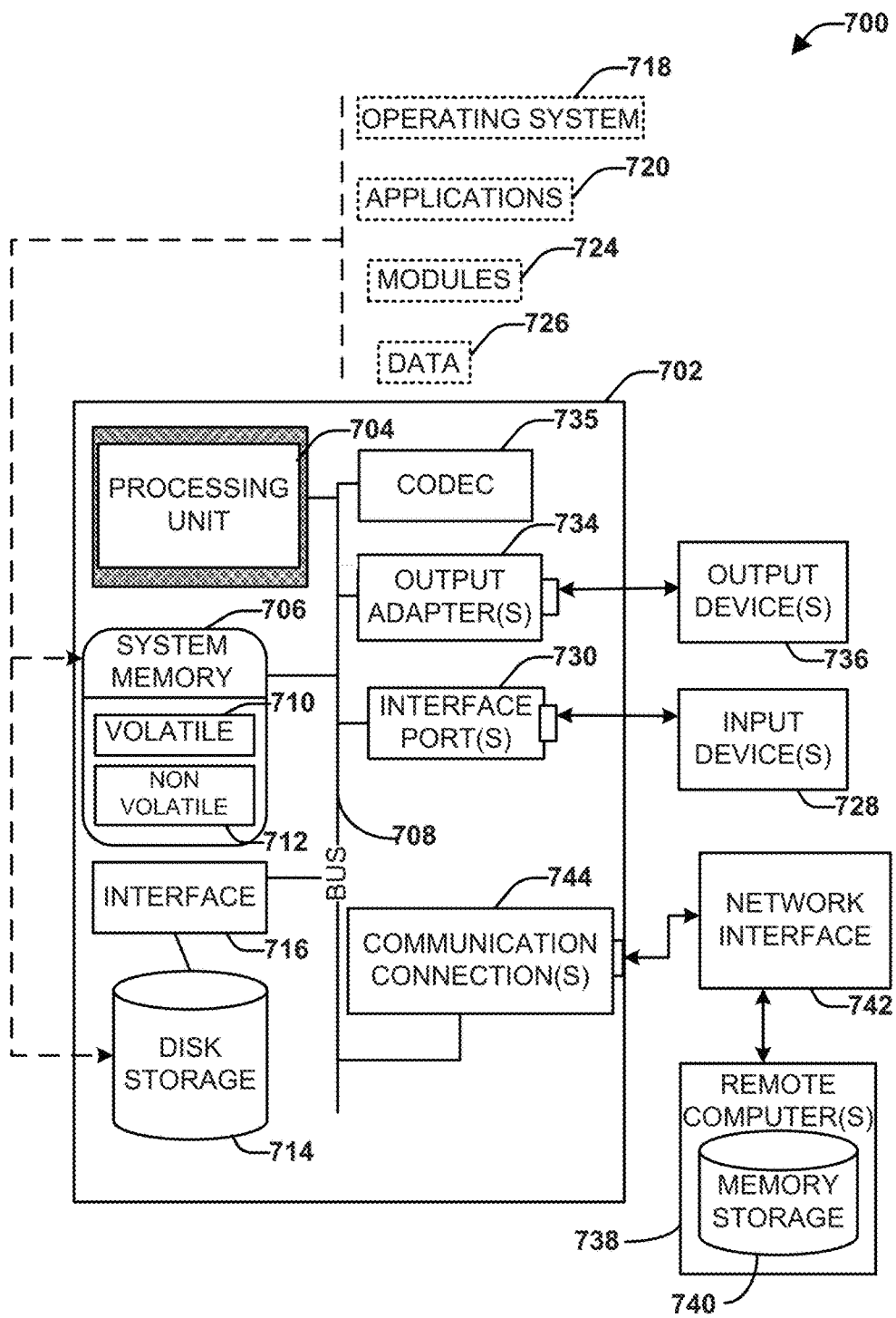
FIG. 7 illustrates a block diagram of an example, non-limiting operating environment in which one or more embodiments described herein can be facilitated.

With reference to FIG. 7, an example environment 700 for implementing various aspects of the claimed subject matter includes a computer 702. The computer 702 includes a processing unit 704, a system memory 706, a codec 735, and a system bus 708. The system bus 708 couples system components including, but not limited to, the system memory 706 to the processing unit 704. The processing unit 704 can be any of various available processors. Dual microprocessors and other multiprocessor architectures also can be employed as the processing unit 704.

The system bus 708 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1374), and Small Computer Systems Interface (SCSI).

The system memory 706 includes volatile memory 710 and non-volatile memory 712, which can employ one or more of the disclosed memory architectures, in various embodiments. The basic input/output system (BIOS), containing the basic routines to transfer information between elements within the computer 702, such as during start-up, is stored in non-volatile memory 712. In addition, according to present innovations, codec 735 can include at least one of an encoder or decoder, wherein the at least one of an encoder or decoder can consist of hardware, software, or a combination of hardware and software. Although, codec 735 is depicted as a separate component, codec 735 can be contained within non-volatile memory 712. By way of illustration, and not limitation, non-volatile memory 712 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 712 can employ one or more of the disclosed memory devices, in at least some embodiments. Moreover, non-volatile memory 712 can be computer memory (e.g., physically integrated with computer 702 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 710 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 702 can also include removable/non-removable, volatile/non-volatile computer storage medium. FIG. 7 illustrates, for example, disk storage 714. Disk storage 714 includes, but is not limited to, devices like a magnetic disk drive, solid state disk (SSD), flash memory card, or memory stick. In addition, disk storage 714 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 714 to the system bus 708, a removable or non-removable interface is typically used, such as interface 716. It is appreciated that disk storage 714 can store information related to an entity. Such information might be stored at or provided to a server or to an application running on an entity device. In one embodiment, the entity can be notified (e.g., by way of output device(s) 736) of the types of information that are stored to disk storage 714 or transmitted to the server or application. The entity can be provided the opportunity to opt-in or opt-out of having such information collected or shared with the server or application (e.g., by way of input from input device(s) 728).

It is to be appreciated that FIG. 7 describes software that acts as an intermediary between entities and the basic computer resources described in the suitable operating environment 700. Such software includes an operating system 718. Operating system 718, which can be stored on disk storage 714, acts to control and allocate resources of the computer system 702. Applications 720 take advantage of the management of resources by operating system 718 through program modules 724, and program data 726, such as the boot/shutdown transaction table and the like, stored either in system memory 706 or on disk storage 714. It is to be appreciated that the claimed subject matter can be implemented with various operating systems or combinations of operating systems.

An entity enters commands or information into the computer 702 through input device(s) 728. Input devices 728 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 704 through the system bus 708 via interface port(s) 730. Interface port(s) 730 include, for example, a serial port, a parallel port, a game port, and a universal serial bus (USB). Output device(s) 736 use some of the same type of ports as input device(s) 728. Thus, for example, a USB port can be used to provide input to computer 702 and to output information from computer 702 to an output device 736. Output adapter 734 is provided to illustrate that there are some output devices 736 like monitors, speakers, and printers, among other output devices 736, which require special adapters. The output adapters 734 include, by way of illustration and not limitation, video and sound cards that provide a means of connection between the output device 736 and the system bus 708. It should be noted that other devices or systems of devices provide both input and output capabilities such as remote computer(s) 738.

Computer 702 can operate in a networked environment using logical connections to one or more remote computers, such as remote computer(s) 738. The remote computer(s) 738 can be a personal computer, a server, a router, a network PC, a workstation, a microprocessor based appliance, a peer device, a smart phone, a tablet, or other network node, and typically includes many of the elements described relative to computer 702. For purposes of brevity, only a memory storage device 740 is illustrated with remote computer(s) 738. Remote computer(s) 738 is logically connected to computer 702 through a network interface 742 and then connected via communication connection(s) 744. Network interface 742 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 744 refers to the hardware/software employed to connect the network interface 742 to the bus 708. While communication connection 744 is shown for illustrative clarity inside computer 702, it can also be external to computer 702. The hardware/software necessary for connection to the network interface 742 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 8:
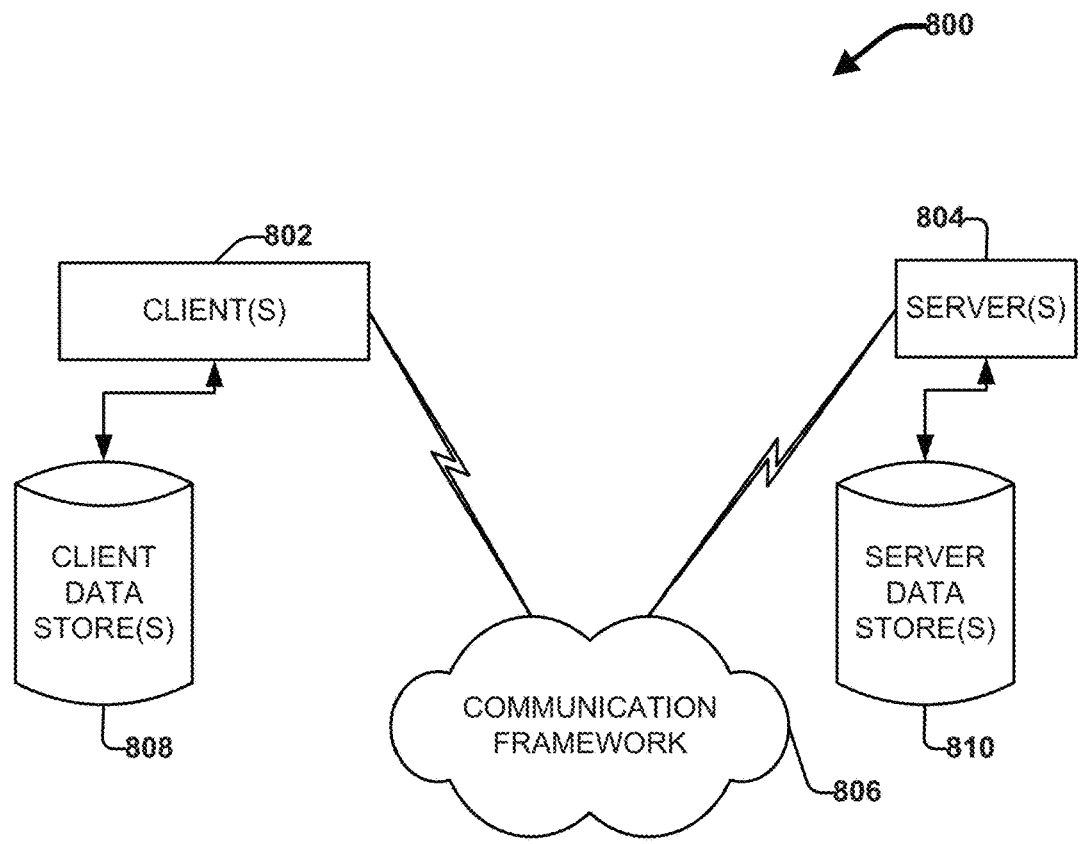
FIG. 8 illustrates a block diagram of another example, non-limiting operating environment in which one or more embodiments described herein can be facilitated.

Referring to FIG. 8, there is illustrated a schematic block diagram of a computing environment 800 in accordance with this disclosure in which the subject systems (e.g., system 100 and the like), methods and computer readable media can be deployed. The computing environment 800 includes one or more client(s) 802 (e.g., laptops, smart phones, PDAs, media players, computers, portable electronic devices, tablets, and the like). The client(s) 802 can be hardware and/or software (e.g., threads, processes, computing devices). The computing environment 800 also includes one or more server(s) 804. The server(s) 804 can also be hardware or hardware in combination with software (e.g., threads, processes, computing devices). The servers 804 can house threads to perform transformations by employing aspects of this disclosure, for example. In various embodiments, one or more components, devices, systems, or subsystems of system 100 can be deployed as hardware and/or software at a client 802 and/or as hardware and/or software deployed at a server 804. One possible communication between a client 802 and a server 804 can be in the form of a data packet transmitted between two or more computer processes wherein the data packet may include healthcare related data, training data, AI models, input data for the AI models, encrypted output data generated by the AI models, and the like. The data packet can include a metadata, e.g., associated contextual information, for example. The computing environment 800 includes a communication framework 806 (e.g., a global communication network such as the Internet, or mobile network(s)) that can be employed to facilitate communications between the client(s) 802 and the server(s) 804.

Communications can be facilitated via a wired (including optical fiber) and/or wireless technology. The client(s) 802 include or are operatively connected to one or more client data store(s) 808 that can be employed to store information local to the client(s) 802 (e.g., associated contextual information). Similarly, the server(s) 804 are operatively include or are operatively connected to one or more server data store(s) 810 that can be employed to store information local to the servers 804 (e.g., the ML model 104 and trained bias-free versions thereof, the ELF 108, the training data 116, and the like).

In one embodiment, a client 802 can transfer an encoded file, in accordance with the disclosed subject matter, to server 804. Server 804 can store the file, decode the file, or transmit the file to another client 802. It is to be appreciated, that a client 802 can also transfer uncompressed file to a server 804 can compress the file in accordance with the disclosed subject matter. Likewise, server 804 can encode video information and transmit the information via communication framework 806 to one or more clients 802.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a training component that trains a machine learning model on training data to perform an inferencing task using an equitable loss function that drives equitable performance of the machine learning model across different sub-groups represented by the training data, resulting in trained version of the machine learning model that provides a defined equitable performance level across the different sub-groups.

2. The system of claim 1, wherein the different sub-groups are labeled in the training data and wherein the equitable loss function is configured to identify the different sub-groups using the labels.

3. The system of claim 1, wherein the equitable loss function penalizes variation in performance of the machine learning model across the different sub-groups.

4. The system of claim 1, wherein the equitable loss function employs different loss weights for at least two of the different sub-groups.

5. The system of claim 4, wherein the different loss weights are based on the relative number of training data samples included in respective sub-groups of the different sub-groups.

6. The system of claim 1, wherein the training component measures performance of the machine learning model across the different sub-groups based on an output of the equitable loss function, and wherein the computer executable components further comprise:
    a reporting component that generates a performance report identifying the performance of the machine learning model across the different sub-groups.

7. The system of claim 1, wherein the training component trains the machine learning model using a supervised machine learning process that comprises a training phase and a validation phase, and wherein the training component uses the equitable loss function during the training phase and the validation phase.

8. The system of claim 1, wherein the training component trains the machine learning model using a supervised machine learning process that comprises a training phase and a validation phase, and wherein the computer executable components further comprise:
    a training data curation component that segregates the training data into a training set and a validation set and further identifies the different sub-groups within the validation set, and wherein the training component uses the equitable loss function during the validation phase on the validation set in association with minimizing loss across the different sub-groups.

9. A method comprising:
    training, by a system comprising a processor, a machine learning model on training data to perform an inferencing task using an equitable loss function that drives equitable performance of the machine learning model across different sub-groups represented by the training data; and
    generating, by the system based on the training, a trained version of the machine learning model that provides a defined equitable performance level across the different sub-groups.

10. The method of claim 9, wherein the different sub-groups are labeled in the training data and wherein the equitable loss function is configured to identify the different sub-groups using the labels.

11. The method of claim 9, wherein the equitable loss function penalizes variation in performance of the machine learning model across the different sub-groups.

12. The method of claim 9, wherein the equitable loss function employs different loss weights for at least two of the different sub-groups.

13. The method of claim 12, wherein the different loss weights are based on relative number of training data samples included in respective sub-groups of the different sub-groups.

14. The method of claim 9, further comprising:
    measuring, by the system, performance of the machine learning model across the different sub-groups based on an output of the equitable loss function; and
    generating, by the system, a performance report identifying the performance of the machine learning model across the different sub-groups.

15. The method of claim 9, wherein the training comprises a training phase and a validation phase, and wherein the training comprises employing the equitable loss function during the training phase and the validation phase.

16. The method of claim 9, wherein the training comprises a training phase and a validation phase, and wherein the method further comprising:
    grouping, by the system, the training data into a training set and a validation set; and
    grouping, by the system, the validation set into subsets respectively corresponding to the different sub-groups, and wherein the training comprises employing the equitable loss function during the validation phase on the validation set in association with minimizing loss across the different sub-groups.

17. A non-transitory machine-readable storage medium, comprising executable instructions that, when executed by a processor, facilitate performance of operations, comprising:
    training a machine learning model on training data to perform an inferencing task using an equitable loss function that drives equitable performance of the machine learning model across different sub-groups represented by the training data; and
    generating, based on the training, a trained version of the machine learning model that provides a defined equitable performance level across the different sub-groups.

18. The non-transitory machine-readable storage medium of claim 17, wherein the different sub-groups are labeled in the training data, and wherein the equitable loss function is configured to identify the different sub-groups using the labels and penalize variation in performance of the machine learning model across the different sub-groups.

19. The non-transitory machine-readable storage medium of claim 17, wherein the equitable loss function employs different loss weights for at least two of the different sub-groups.

20. The non-transitory machine-readable storage medium of claim 19, wherein the different loss weights are based on relative number of training data samples included in respective sub-groups of the different sub-groups.

* * * * *